(12) United States Patent
Pulvermacher et al.

(10) Patent No.: US 11,596,266 B2
(45) Date of Patent: Mar. 7, 2023

(54) WIRELESS TEMPERATURE-MEASUREMENT SYSTEM

(71) Applicant: Matrix Product Development, Inc., Sun Prairie, WI (US)

(72) Inventors: Ronald J. Pulvermacher, Cottage Grove, WI (US); David J. Pulvermacher, Middleton, WI (US); Donald E.Z. Weier, Madison, WI (US); Kerry Woodbury, Middleton, WI (US)

(73) Assignee: Matrix Product Development, Inc., Sun Prairie, WI (US)

( * ) Notice: Subject to any disclaimer, the term of this patent is extended or adjusted under 35 U.S.C. 154(b) by 986 days.

(21) Appl. No.: 16/271,436

(22) Filed: Feb. 8, 2019

(65) Prior Publication Data

US 2019/0339133 A1  Nov. 7, 2019

Related U.S. Application Data

(60) Provisional application No. 62/666,546, filed on May 3, 2018.

(51) Int. Cl.
| | |
|---|---|
| *G01K 1/08* | (2021.01) |
| *A47J 37/07* | (2006.01) |
| *G01K 1/14* | (2021.01) |
| *G01K 1/022* | (2021.01) |
| *G01K 1/024* | (2021.01) |
| *H02J 7/34* | (2006.01) |

(52) U.S. Cl.
CPC .......... *A47J 37/0786* (2013.01); *G01K 1/022* (2013.01); *G01K 1/024* (2013.01); *G01K 1/14* (2013.01); *H02J 7/345* (2013.01)

(58) Field of Classification Search
USPC ................... 320/106, 107, 108, 110; 474/149
See application file for complete search history.

(56) References Cited

U.S. PATENT DOCUMENTS

| | | | | |
|---|---|---|---|---|
| 3,303,701 A | * | 2/1967 | Matsuura ............... | G01K 13/08 340/870.37 |
| 8,463,332 B2 | | 6/2013 | Sato et al. | |
| 8,890,489 B2 | | 11/2014 | Wood | |
| 9,719,862 B2 | | 8/2017 | Meyerson | |

(Continued)

FOREIGN PATENT DOCUMENTS

| | | | | | |
|---|---|---|---|---|---|
| CN | 103857555 A | * | 6/2014 | ................ | B60L 1/00 |
| CN | 110146183 A | * | 4/2018 | | |

(Continued)

OTHER PUBLICATIONS

"Meater®" by Apption Labs Limited of Encino California.

(Continued)

*Primary Examiner* — Brian Ngo
(74) *Attorney, Agent, or Firm* — Jansson Munger McKinley & Kirby Ltd.

(57) ABSTRACT

A wireless temperature-measurement system comprising (a) one or more temperature probes each including one or more energy-storage capacitors which supply the electrical energy for operation of the probe(s) and (b) a probe-charging station having circuitry configured to supply electric charge to the energy-storage capacitors prior to the temperature probes being positioned to measure temperature.

28 Claims, 16 Drawing Sheets

(56) References Cited

U.S. PATENT DOCUMENTS

| | | | | |
|---|---|---|---|---|
| 10,024,736 B2* | 7/2018 | Nivala | ............ | G01K 7/42 |
| 2006/0016806 A1 | 1/2006 | Cristiani | | |
| 2009/0105605 A1* | 4/2009 | Abreu | ............ | H04N 5/2256 |
| | | | | 600/549 |
| 2010/0327766 A1* | 12/2010 | Recker | ............ | H02J 50/20 |
| | | | | 362/20 |
| 2018/0368617 A1* | 12/2018 | Allmendinger | ...... | A47J 37/0754 |
| 2019/0267812 A1* | 8/2019 | Bonilla | ............ | H02J 7/0047 |
| 2019/0339133 A1* | 11/2019 | Pulvermacher | ...... | G01K 1/026 |
| 2019/0391227 A1* | 12/2019 | Zhang | ............ | G01S 5/14 |

FOREIGN PATENT DOCUMENTS

| | | | | |
|---|---|---|---|---|
| CN | 209878152 U | * | 12/2019 | |
| EP | 1 577 653 A1 | | 9/2005 | |
| WO | 02/19508 A2 | | 3/2002 | |
| WO | 2016/171775 A1 | | 10/2016 | |
| WO | WO-2017069813 A1 | * | 4/2017 | ............ A23B 4/052 |
| WO | WO-2019009657 A1 | * | 1/2019 | ............ G01K 7/32 |

OTHER PUBLICATIONS

Battery-free temperature sensor by Farsens of San Sebastian, Spain.
Vernier "Vernier Go Direct Charge Station"; Product Datasheet; Publication [online]. Apr. 2, 2018 [retrieved Apr. 9, 2019]. Retrieved from the Internet: <URL: https://www.vernier.com/files/manuals/gdx-crg.pdf>.

* cited by examiner

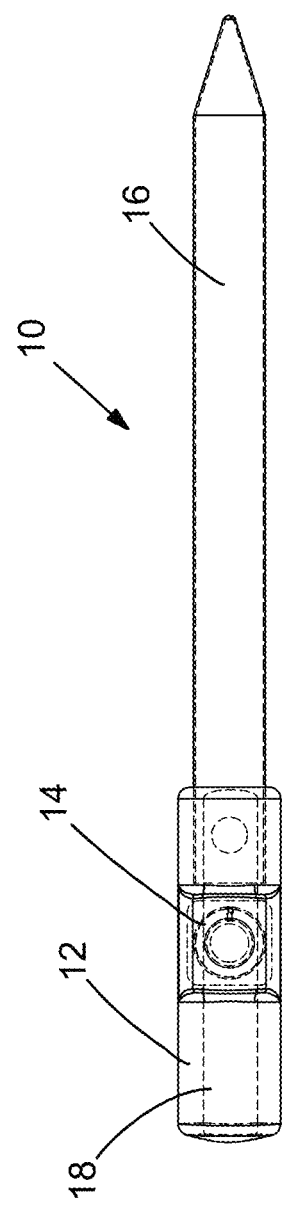
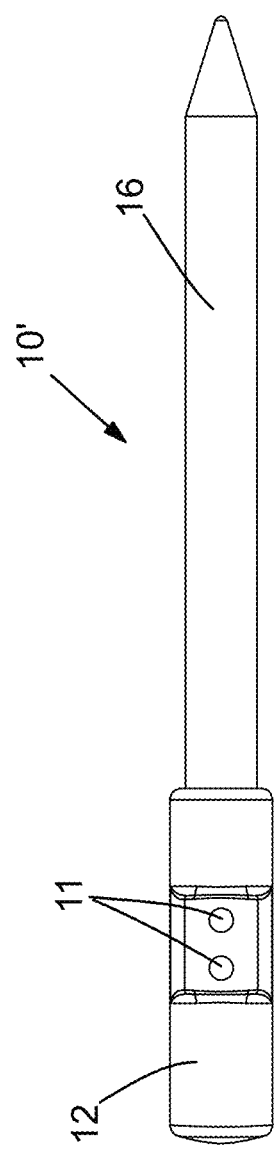

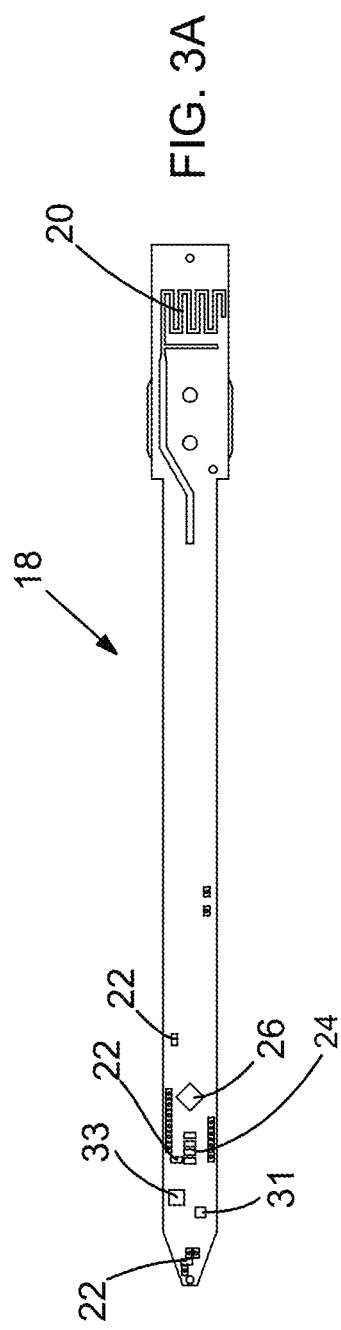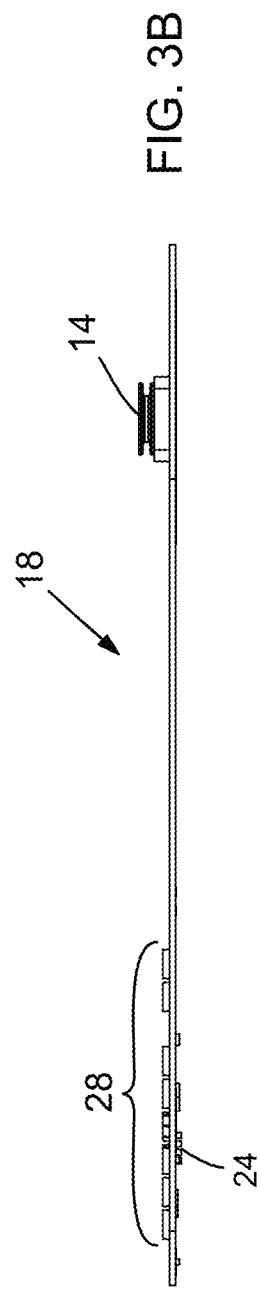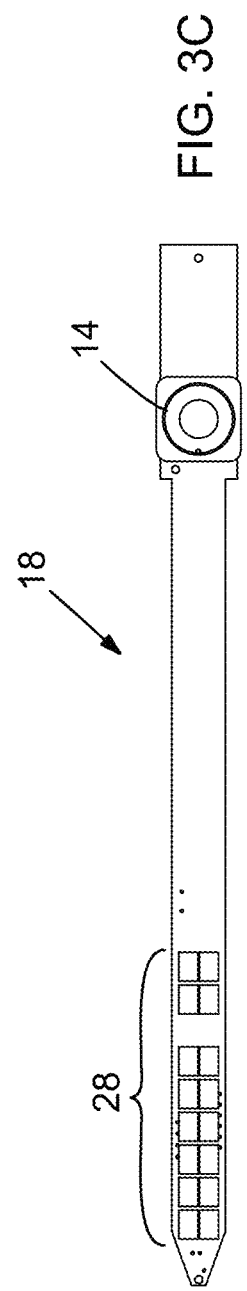

WIRELESS TEMPERATURE-MEASUREMENT SYSTEM

RELATED APPLICATION

This application claims the benefit of U.S. Provisional Application No. 62/666,546, filed on May 3, 2018, the contents of which is incorporated by reference herein in its entirety.

FIELD OF THE INVENTION

This invention relates generally to systems for measuring temperature and more particularly to measurement systems which measure the temperature in environments in which high temperatures may be encountered, such as during the cooking of food.

BACKGROUND OF THE INVENTION

There is a need for reliable and safe temperature-measurement systems, particularly for the food industry. Among the issues which exist within such applications is the safety of such systems by preventing any contamination of food being cooked from the measurement system itself. The safety of the food product itself, such as caused by failure to reach a safe temperature level, is a significant concern; the legal and financial ramifications of biologically-contaminated food product from undercooking are enormous. Further, the quality of a food product often depends on proper cooking times and temperatures, such as avoiding overcooking which can have significant and costly market implications.

Creation of a 400-600° F. high-temperature wireless temperature probe for cooking is difficult due to the limited materials that can be used to withstand high temperatures. In addition, such probes may be used in a variety of applications such as cooking in apparatus such as rotisseries, crock pots, ovens, grills, sous vide appliances, and in a variety of commercial cooking equipment. The electronics and energy source in such probes must be housed in the temperature probe tip that is inserted into the food product, thus keeping the electronics and energy source at a temperature below 212° F. However, if the probe falls out of the food product, the probe may be exposed to high temperatures that can cause materials to incinerate and expel toxic gases. For example, in a rotisserie oven, chicken meat gets very tender and may fall off the rotating spit. In this situation, if the probe contains a lithium-ion battery as its energy source, it would vent toxic gases into the oven and into the room after being exposed to such high heat.

One product on the market is called "Meater®" and was developed by Apption Labs Limited of Encino Calif. The "Meater®" uses a rechargeable lithium-ion battery that outgases when exposed to temperatures greater than 400° F., a temperature often exceeded in commercial rotisserie ovens.

At least one other battery-free temperature sensor is available, from Farsens, a company in San Sebastian, Spain. These battery-free temperature sensors are based on RFID technology and are not built to withstand the high temperatures and harsh conditions of the applications addressed by the inventive sensor disclosed herein.

The inventive temperature-measurement system disclosed herein, although presented in the context of a food-cooking application, is more broadly applicable.

OBJECTS OF THE INVENTION

It is an object of the present invention to provide a temperature sensor which is battery-free.

Another object of the present invention is to provide a temperature sensor which does not outgas or otherwise release toxic chemicals when it is exposed to temperatures of up to 600° F.

Another object of the present invention is to provide a wireless temperature sensor which is able to monitor and transmit temperature data for extended periods of time. Another object of the present invention is to provide a temperature sensor which can be energized quickly between operational periods.

Yet another object of the present invention is to provide a temperature sensor to which operating parameters can be transmitted and from which an identification number can be received.

Yet another object of the present invention is to provide temperature sensors which can be employed in groups of sensors within a single application apparatus, such as a commercial oven.

These and other objects of the invention will be apparent from the following descriptions and from the drawings

SUMMARY OF THE INVENTION

The present invention is a wireless temperature-measurement system which comprises (a) one or more temperature probes each including one or more energy-storage capacitors which supply the electrical energy for operation of the one or more probes and (b) a probe-charging station having circuitry configured to supply electric charge to the energy-storage capacitors prior to the temperature probes being positioned to measure temperature. In some preferred embodiments of the wireless temperature-measurement system, the energy-storage capacitors are of one or more types of capacitors. In some of these embodiments, at least a portion of the energy-storage capacitors are double-layer capacitors, and in some of these embodiments, at least a portion of the energy-storage capacitors are ceramic capacitors.

In some highly-preferred embodiments of the wireless temperature-measurement system, each probe further includes circuitry to periodically measure temperature values and transmit the temperature values, and the system further includes a reader to receive the temperature values. In some of these embodiments, the reader is a programmable computer-based device, and in some of these embodiments, the reader is configured to store the temperature values.

In some highly-preferred embodiments, the charging station is configured to send operational parameters to at least one of the probes during charging. In some of these embodiments, the operational parameters include probe sleep times between periodic measurements of temperature values, and in some of these embodiments, the operational parameters include temperature-value-dependent probe sleep times. Further, in some embodiments, the reader is programmed to determine the operational parameters, and in some embodiments, the reader sends the operational parameters to the one or more probes during charging.

In other highly-preferred embodiments of the wireless temperature-measurement system, the probe-charging station is configured to charge multiple probes simultaneously and to communicate to the reader a probe ID for each of the probes. In some of these embodiments, the reader is configured to transmit a probe ID and temperature values to a cloud-hosted server or a local server to create an electronic record.

In some embodiments in which the inventive wireless temperature-measurement system is used with a grill, the reader is a gauge/reader, and the wireless temperature-measurement system has a fan which controls airflow to the grill. In some of these embodiments, the grill temperature is set using a smartphone.

In other preferred embodiments of the wireless temperature-measurement system, each probe is configured to detect when it is connected to the probe-charging station and to create a wireless communication link between itself and the probe-charging station.

In some preferred embodiments, the probe-charging station charges the energy-storage capacitors wirelessly. In some of these embodiments, the probe-charging station receives a probe ID from each of the probes and retransmits the probe ID to a reader.

In other embodiments of the wireless temperature-measurement system, the probe-charging station charges the energy-storage capacitors through direct electrical connections. In some of these embodiments, the probe-charging station receives a probe ID from each of the probes and retransmits the probe ID to a reader.

In some other preferred embodiments of the wireless temperature-measurement system, the probe-charging station is configured to send operational parameters to the one or more probes during charging. In some of these embodiments, the operational parameters include probe sleep times between periodic measurements of temperature values, and in some of these embodiments, the operational parameters include temperature-value-dependent probe sleep times.

In some highly-preferred embodiments of the wireless temperature-measurement system, each of the temperature probes includes a step-up power supply, thereby substantially preventing the energy-storage capacitors from discharging while disconnected from the charger. In some of these embodiments, each of the temperature probes includes a step-down power supply.

In some highly-preferred embodiments of the wireless temperature-measurement system, each of the probes includes a sheath portion, and each sheath portion to accommodate internal electronic components. In some of these embodiments, the sheath portion has an elliptical cross-sectional shape, and in some embodiments, the sheath portion has a circular cross-sectional shape.

The term "computer-based reader" as used herein refers to devices including but not limited to a smartphone, a tablet computer, or other computer. Computer-based readers are devices which are programmable and may include a display.

The term "cloud-hosted" as used herein refers to systems which are remote and connected via the so-called World Wide Web and to which an embodiment of the wireless temperature-measurement system disclosed herein is linked.

BRIEF DESCRIPTION OF THE DRAWINGS

FIG. 1 is a front view of an embodiment of the inventive wireless temperature probe.

FIG. 2 is a front view an alternative embodiment of the inventive wireless temperature probe.

FIG. 3A is a bottom view of the printed circuit board assembly of the wireless temperature probe of FIG. 1.

FIG. 3B is a side view of the printed circuit board assembly of the wireless temperature probe of FIG. 1.

FIG. 3C is a top view of the printed circuit board assembly of the wireless temperature probe of FIG. 1.

DETAILED DESCRIPTION OF PREFERRED EMBODIMENTS

Figure 4:
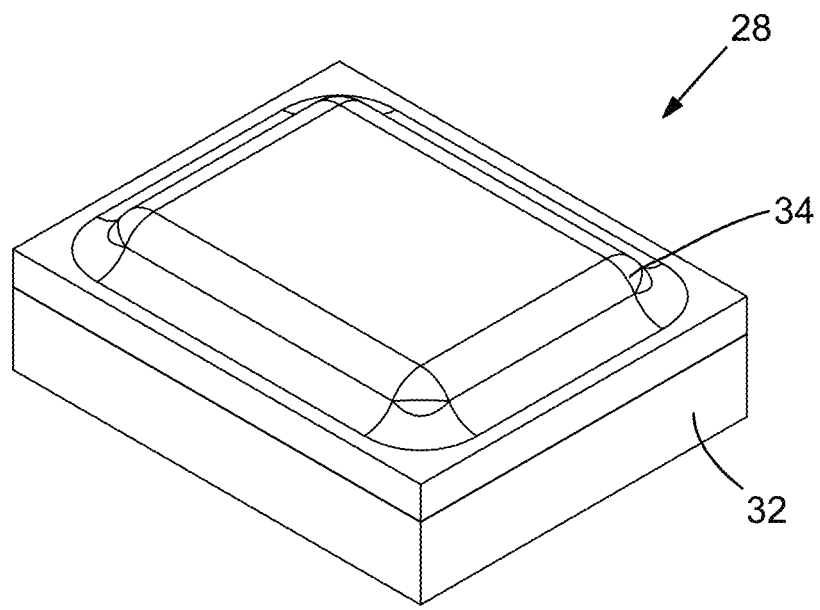
FIG. 4 is a highly-enlarged perspective view of an energy-storage capacitor of the temperature probe of FIG. 1.

The present inventive temperature probe utilizes electrical charge stored in one or more capacitors as a source of power for the probe, avoiding the emission of toxic gases from battery-based energy sources. The inventive probe uses an ultra-low power transmitter, a combination of capacitor technologies that have low leakage and high capacitance that can deliver peak pulse currents during data transmission; such capacitors may be ceramic capacitors and electric double-layer type capacitors.

Firmware in an onboard microprocessor is used to put the processor into a deep-sleep state such that the probe can operate over time periods long enough to cover an entire cooking cycle. Additionally, the inventive temperature-measurement system includes a novel approach of pairing the probe identification number (ID) with a reading device. The reading device may be a smartphone, a tablet or other form of computer, or a dedicated reader.

Manually reading the identification (ID) number of a probe and entering it into a reader can be done; however it is tedious and prone to errors. The inventive system overcomes these limitations by having the temperature probe detect when it is being charged in a charging station which then causes it to transmit its ID number to its charging station. The charging station then makes a wireless connection to the reader and transfers the probe number or numbers. If a plurality of probes and a multi-station charger is used, then all the probe ID numbers on the charging station are transferred to the reader. This is particularly useful in large applications with multiple ovens which utilize multiple probes per oven. In this case, the charger may include an oven number selector so that probe ID numbers may be sent to the selected oven. The reader may transmit the probe ID number and temperature information to a cloud-hosted server or a local server to create an electronic cooking record.

FIGS. 1-14 and 16A-16E present details of an embodiment of the inventive wireless temperature-measurement system. The text below includes descriptions of embodiments of the various subsystems within the inventive wireless temperature-measurement system. FIG. 15A shows a functional block diagram of an embodiment 10 of the inventive wireless high-temperature measurement probe 15 (also referred to as probe 10) and wireless charging system, and FIG. 15B shows a functional block diagram of the alternative embodiment 10' of the inventive wireless high-temperature measurement probe (also referred to as probe 10') with a direct-connect charging system.

FIGS. 16A-16E show detailed electrical circuit embodiments of probes 10 and 10'. (The circuits for both probe 10 and probe 10' are illustrated with the written descriptions pointing out the differences as appropriate.) In the various functional blocks of the circuits of FIGS. 16A-16E, the integrated circuit chips are numbered in accordance with the detailed annotations of the circuit, as noted below. Connection points between the various portions of the circuits of FIGS. 16A-16E are labeled by the letters A, B and C within small circles. FIGS. 16A-16E also use commonly-practiced printed circuit board notation to indicate lines with like annotation as being connected and other common annotation conventions for printed circuit boards.

FIGS. 1 and 3A-3C illustrate an embodiment of wireless high-temperature probe 10 according to the present invention. Temperature probe 10 includes a sheath 16 having a flattened (elliptical—see also FIG. 6A) cross-sectional shape, a non-metallic handle 12, a printed circuit board assembly 18, and a charging coil 14.

Probe 10 measures a food temperature by inserting sheath 16 into the food product (not shown) while handle 12 remains outside the food product and may be exposed to the high-temperatures of an oven or grill (not shown). Printed circuit board assembly 18 includes a radio/microprocessor combination circuit 26, one or more temperature sensors 22, one or more ceramic capacitors 24, one or more electric double-layer capacitors 28, a transmitting antenna 20, and charging coil 14. Radio/microprocessor combination circuit 26 may include a single integrated circuit (such as 26U2—see FIG. 16E) but may include two separate integrated circuits consisting of a radio and a microprocessor. The microprocessor portion of radio/microprocessor combination 26 is programmable and thus highly-configurable.

FIG. 2 illustrates alternative probe embodiment 10'. Temperature probe 10' includes electrical contacts 11 which are connected directly to an electrical charging source 41 or DC power source 41 (see FIG. 15B).

Referring again to FIGS. 3A-3C, 15A and 15B, the radio/microprocessor combination 26 may include a Bluetooth® low-energy chip 26U2 (see FIG. 16E) such as an RSL10-series chip (NCH-RSL10-101WC51-ABG) from ON Semiconductor® of Phoenix, Ariz. Other similar Bluetooth® low-energy chips may also be used. The radio transmits an identification number (ID) of probe 10 via antenna 20 to a reader 60 or a reader 122. (See FIGS. 8 and 14.) Radio/microprocessor combination 26 also detects (with charging detection circuit 26D—also see FIGS. 16D and 16E) when probe 10 is charging and forms a communication link with a charger 38 or multi-charger 48. (See FIGS. 5-7.) Radio/microprocessor combination 26 then transmits its identification (ID) number to charger 38 or multi-charger 48 and receives operating parameters therefrom including time intervals to read and to transmit probe 10 temperatures. These intervals may vary depending on the probe 10 temperature reading. For example, a 15-minute temperature interval may be used when the temperature of the food product is below 125° F., and a 2-minute interval may be used when the temperature is above 125° F.

Referring again to FIG. 15A, a charging circuit 30 receives energy from charging coil 14 and charges capacitors 24 and 28. Charging circuit 30 includes charging coil 14 to receive electrical energy wirelessly from charger 38 (or multi-charger 48). The electrical power from charging circuit 30 is then rectified by a bridge rectifier 30R, the output of which is inputted to a buck power supply 31 (e.g., a 1.8V step-down power supply 31) that lowers the voltage then provided to a boost power supply 33 (e.g., a 3.3V step-up power supply 33). Buck power supply 31 includes chip 31U4 (also see FIG. 16D) which may be chip TPS62171DSGT available from Texas Instruments™ Incorporated of Dallas, Tex.

A boost power supply 33 (e.g., a 3.3V step-up power supply) charges ceramic capacitors 24 and electric double-layer capacitors 28. Power supply 33 is configured so that it does not discharge capacitors 24 and 28 when charging power is not applied. Boost power supply 33 includes chip 33U7 (also see FIG. 16D) which may be chip MAX17222ELT+ available from Maxim Integrated™ of San Jose, Calif.

The electrical energy stored in capacitors 24 and 28 is used to operate radio/microprocessor combination 26 that reads the temperatures from temperature sensors 22 (in this embodiment, three sensors 22) and transmits the temperature data via antenna 20. In an application such as measuring temperature in food during cooking, temperature measurements from multiple sensors 22 may be useful, taking particular note of the lowest temperature among the multiple temperatures measured to ensure as much as possible that a target final temperature has been reached throughout the food.

Radio/microprocessor combination 26 is configured to detect when charging is occurring via charging detection circuit 26D that then causes radio/microprocessor combination 26 to create a Bluetooth® communication link (not shown) with charger 38 (or 48) to transfer information such as its ID number and receive operating parameters from charger 38 (or 48) or from any Bluetooth® transceiver such as reader 122.

Radio/microprocessor combination 26 sends power via connection 35 to temperature sensors 22 to initiate temperature readings, and temperature data is read by radio/microprocessor combination 26 via connection 37.

An important aspect of the electrical configuration of probe 10 is to use only components that do not outgas toxic gas when exposed to temperatures of 400-600° F. Handle 12 and the bodies or cases of the integrated circuits may be made of a liquid crystal polymer (LCP). LCP's are polymer materials which have high heat resistance, wear resistance, strength and mechanical integrity. Handle 12 may be made of Vectra® LCP available from Celanese® Corporation headquartered in Dallas, Tex. Integrated circuit chips which are packaged in LCP are well-known to those skilled in circuit design and need not be described further herein.

Ceramic capacitors 24 have low equivalent series resistance and can deliver the peak pulse currents necessary during temperature reading and data transmission and do not outgas at high temperatures. Such capacitors 24 are available from numerous suppliers.

Sheath 16, in which printed circuit board assembly 18 is encased, is filled with an epoxy potting material (not shown). One such epoxy material is EP1056LV from Resin-Lab® LLC, a subsidiary of Ellsworth Adhesives Company and located in Germantown, Wis. Since the epoxy is located within sheath 16, under normal operating conditions, the material only has to withstand temperatures up to 212° F. However, if probe 10 falls out of the food product being cooked, the epoxy material does not outgas if exposed to temperatures as high as 400-600° F.

Referring to FIG. 4, electric double-layer capacitors 28 have a high capacitance value and extremely low self-discharge currents which result in the extremely low sleep currents necessary for long run times, some of which may exceed 16 hours. Capacitors 28 may be models CPH3225A or CP3225A which are 11 mF (11 millifarads) capacitors manufactured by the Micro Energy Division of Seiko® Instruments Inc. of Miyagi, Japan. Other similar capacitors may also be used. Such electric double-layer capacitors 28 are constructed of a ceramic base 32 and a metal cap 34 that is hermetically sealed, entrapping the capacitive material and preventing outgassing at temperatures up to 600° F.

Such lack of outgassing is a highly-significant feature of inventive temperature probe 10. Typically, lithium-ion batteries are used as energy sources in such small sensors since such batteries contain the higher energy-storage levels needed to run the products for extended periods of time. However, lithium-ion batteries incinerate at temperatures of 400-600° F. and are known to outgas toxic gases that can irritate eyes, lung tissue, skin, or mucous membranes, in addition to polluting foods and rendering them inedible.

Charger 38 (or 48) charges probe capacitors 24 and 28 wirelessly via a charging coil 40 to deliver electrical energy to probe charging coil 14. (See FIGS. 2 and 15B for alternative embodiment 10' of the inventive temperature probe employing a DC power source 41 connected to direct mechanical electrical contacts 11.) Wireless charger 38 (or 48) may operate at low frequencies (LF) of 100-150 kHz or high frequencies (HF) of 13-14 MHz. Wireless charger 38 (or 48) also forms a wireless communication link with the radio/microprocessor combination 26 and probe antenna 20 to receive the probe ID and to pass operating parameters to probe 10. These operating parameters may include the amount of time to put the microprocessor in probe 10 in a low-power sleep-mode between temperature readings and data transmissions, significantly affecting the probe operating time. Long cooking times may require longer sleep times to extend the operating time to 16 hours or more.

A second parameter passed to probe 10 may specify a different sleep time after the temperature increases to near a preset "cook-done temperature." This may also include a graduated sleep time based on temperature.

Figure 5:
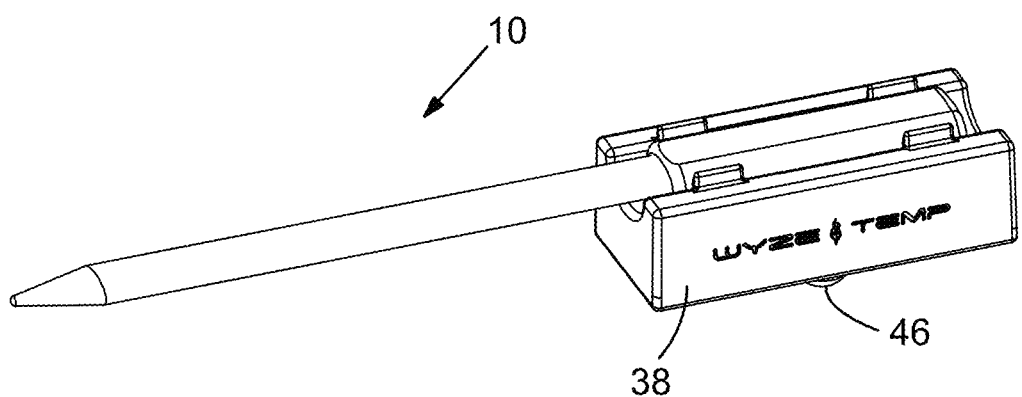
FIG. 5 is a perspective view of the wireless temperature probe of FIG. 1 placed in a charger.
Figure 6A:
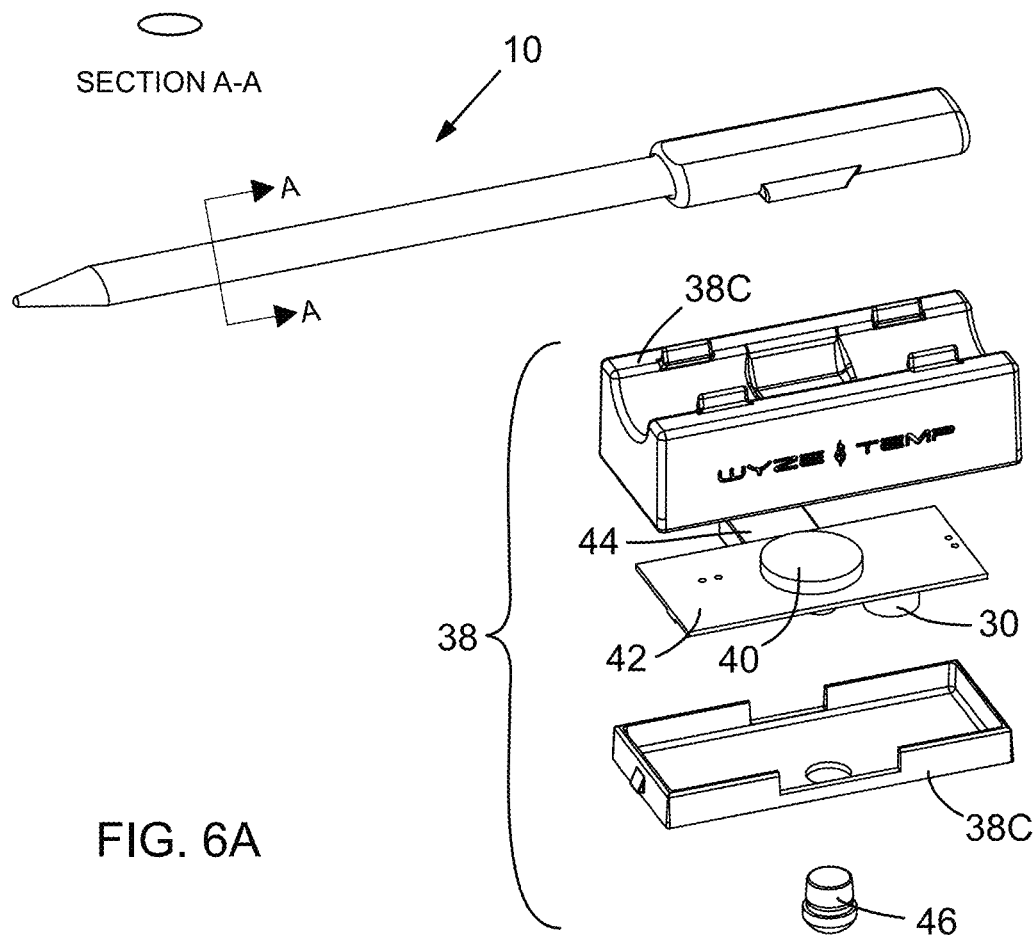
FIG. 6A is an exploded perspective view of the charger and the wireless temperature probe of FIG. 5.
Figure 6B:
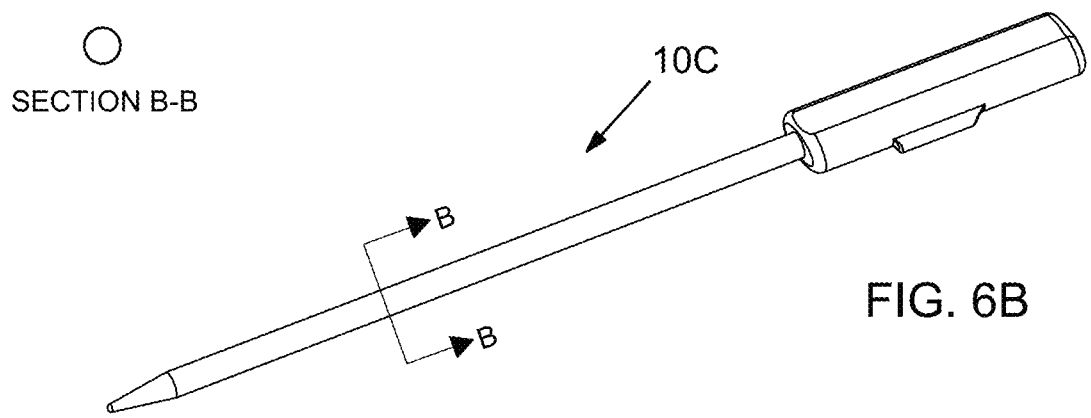
FIG. 6B shows an alternative embodiment of the wireless temperature probe, the probe having a circular cross-section.

The probe charger may be a single-unit charger 38 capable of charging a single probe 10. FIG. 5 is a perspective view of wireless temperature probe 10 placed in single-probe wireless charger 38, and FIG. 6A is an exploded perspective view of charger 38. Charger 38 reads the probe ID number and sends it to the reader 60 or reader 122. Single-station charger 38 includes a printed circuit board assembly 42, a USB port 44 to receive incoming power, a charging circuit 30, a charging coil 40 to transfer electrical energy to probe 10, and a multi-color charge indicator LED 46. Charger 38 includes charger case 38C in two portions as illustrated in FIG. 6A. FIG. 6A also illustrates the elliptical cross-sectional shape of probe 10 (see SECTION A-A). FIG. 6B illustrates a probe 10C which has an alternative cross-sectional shape, in this case, a circular cross-sectional shape (see SECTION B-B). Other cross-sectional shapes are intended to be within the scope of this invention.

Figure 7:
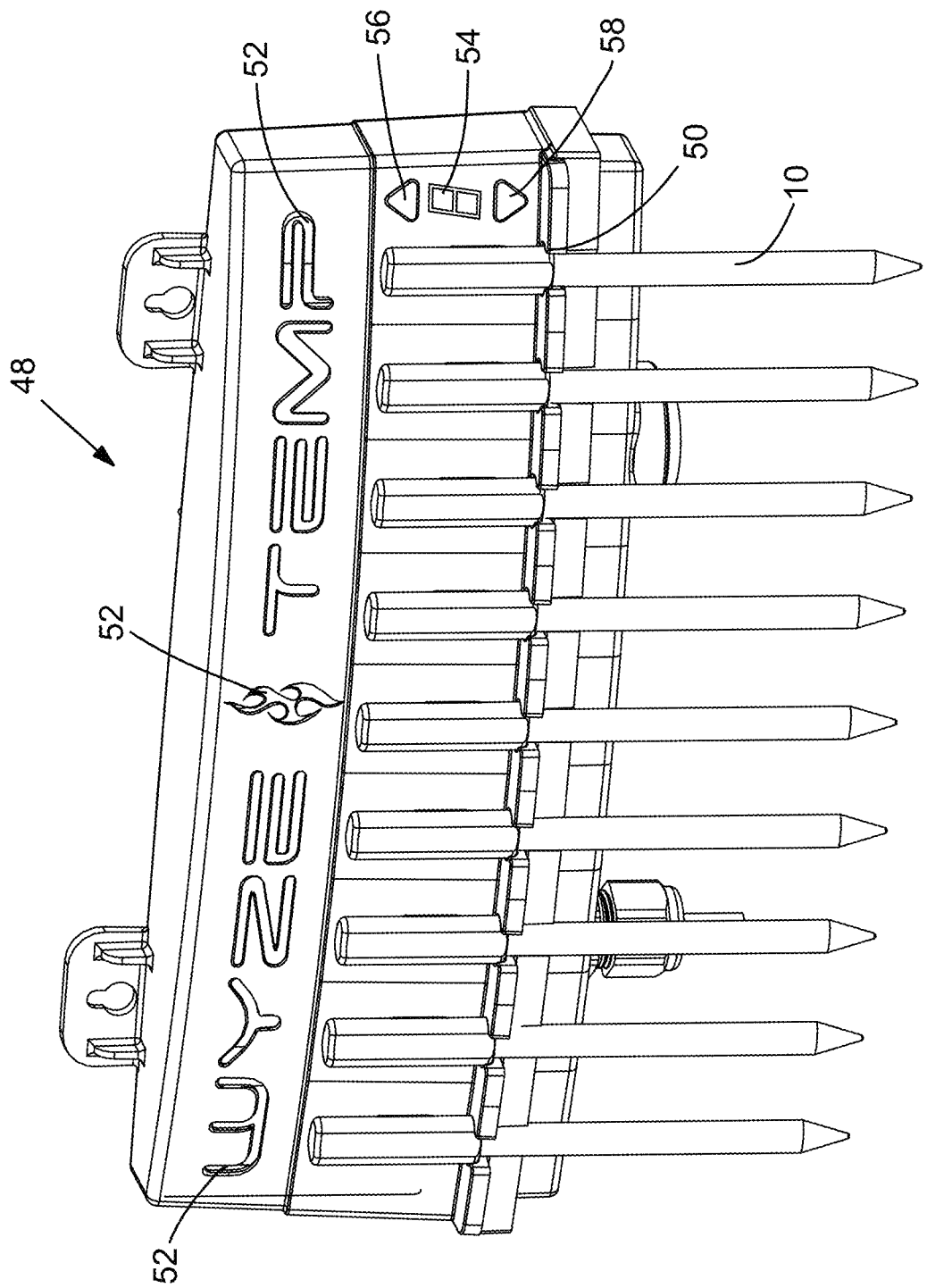
FIG. 7 is a perspective view of a multi-station charger with a plurality of wireless temperature probes of FIG. 1.

Referring to FIG. 7, the probe charger may be a multi-station charger 48 capable of simultaneously charging multiple probes 10 in probe slots 50. Nine slots 50 and nine probes 10 are shown in FIG. 7. Multi-station charger 48 reads the probe ID numbers and sends them to reader 60 or 122. Multi-station charger 48 may have an indicator 54 that may be set to a specific oven number. Up and down switches 56 and 58, respectively, are actuated to increment the oven number up or down. During a charging cycle or at the end of a charging cycle, multi-station charger 48 sends a probe ID for each probe 10 being charged to reader 60 or 122 and passes operating parameters from reader 60 or 122 to each of probes 10.

Charger 38 and 48 each include one or more multi-color LEDs 46 and 52, respectively, which are illuminated when the presence of probe 10 is detected by measuring an increase in charging current. LED 46 is viewable from the side of charger 38, and in FIG. 7, LEDs 52 are shown as the eight letters "WYZE TEMP" and the flame symbol between these two words. (WYZE TEMP® is a registered trademark of Matrix Product Development of Sun Prairie, Wis.) LEDs 52 need not be configured in such fashion; simple individual LEDs next to each probe 10 may be employed. Charger 38 or 48 may change the LED color according to the amount of charging current detected and turn the multi-color LED 46 or LEDs 52 green (or other color) to indicate when the charging cycle is complete.

Figure 8:
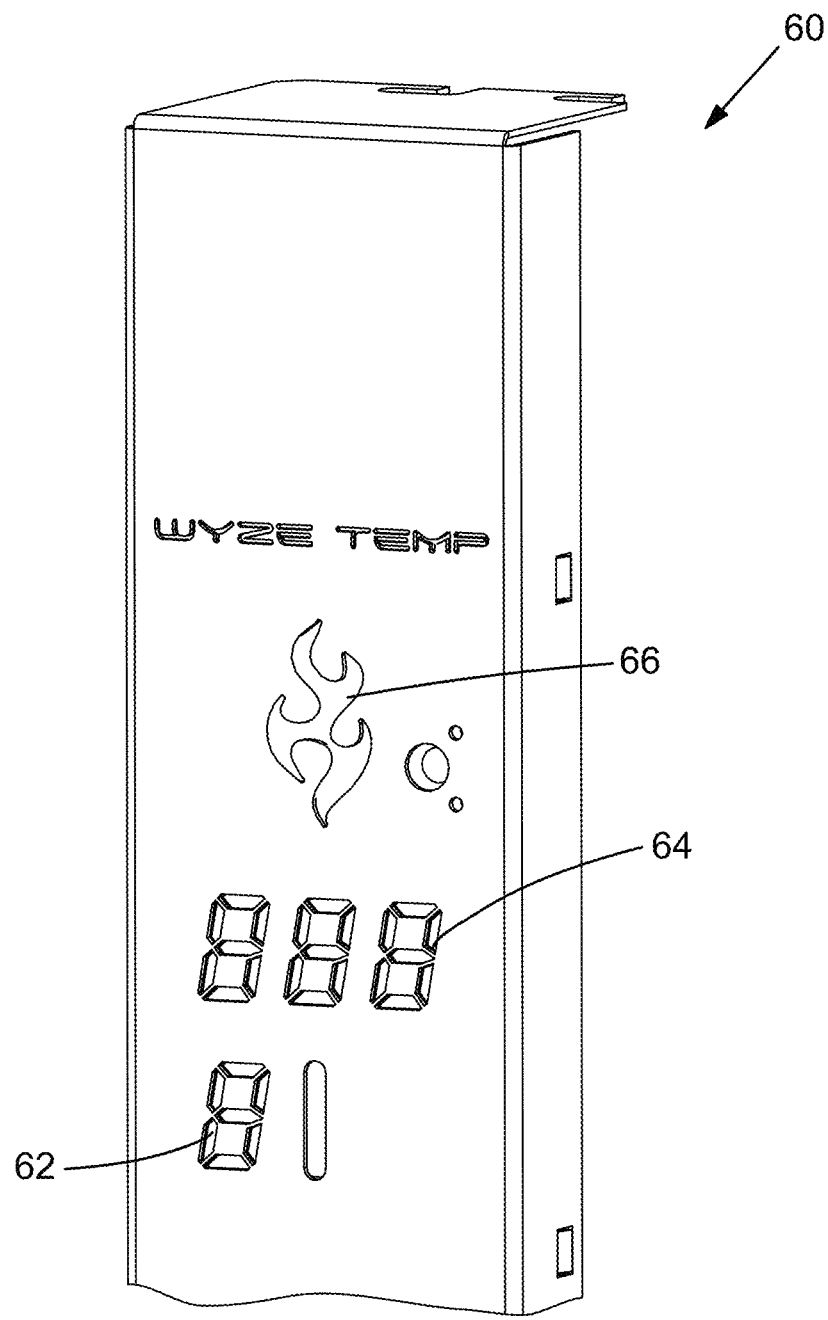
FIG. 8 is a partial perspective view of an embodiment of a reader.
Figure 9:
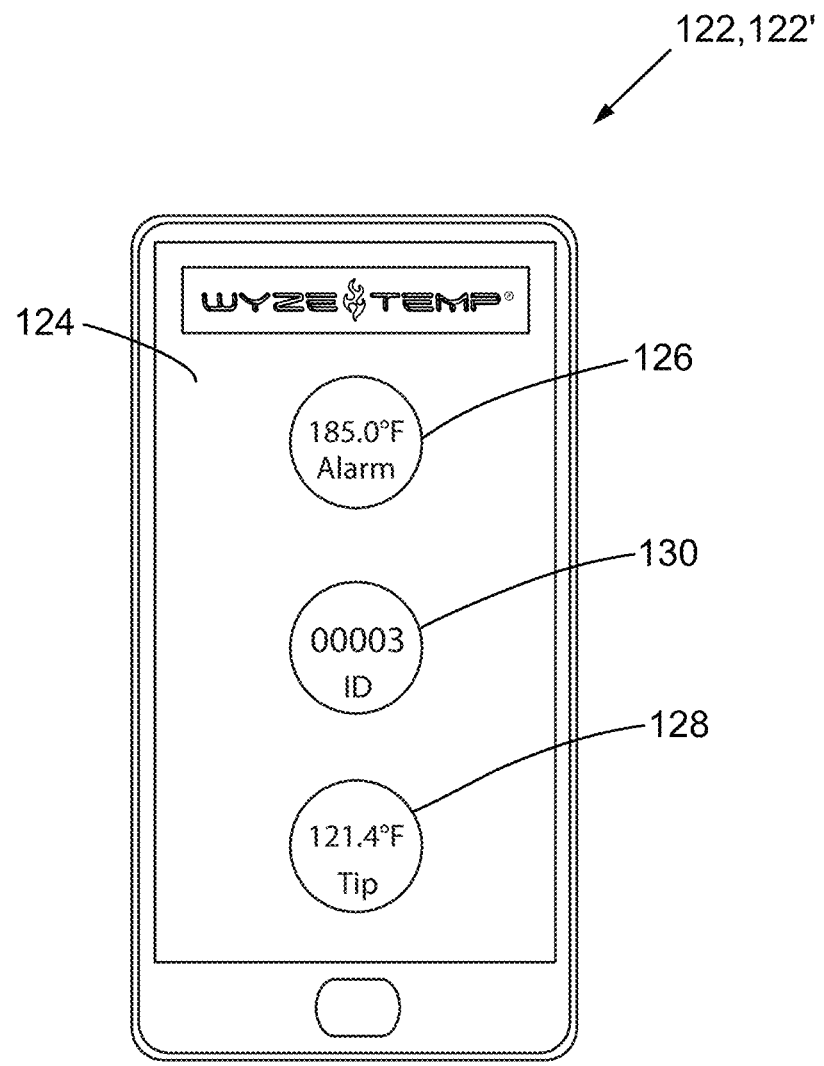
FIG. 9 is a perspective view of an embodiment of a smartphone reader.

Referring to FIGS. 8 and 9, the reader may be a dedicated reader 60 or a smartphone, tablet computer or other computer-based reader 122 that includes a Bluetooth® and/or Wi-Fi radio. Dedicated reader 60 may include a multi-color temperature indicator 66. When the temperature is below, for example 165° F., indicator 66 may be blue. When the temperature is above 165° F., indicator 66 may turn yellow, and when the measured temperature reaches the "cook-done temperature," indicator 66 may turn green. For example, in the case of rotisserie chicken, this "cook done temperature" may be 180° F., and after all probe 10 temperatures exceed this temperature, indicator 66 turns green.

Reader 60 may include a multi-digit LED display 64 that indicates the lowest temperature among all of the probes 10 in the oven. In this embodiment of reader 60, a single-digit indicator 62 displays the oven number. Oven number indicator 62 may be set by depressing a button switch (not shown) during installation and setup.

Reader 60 or 122 may create a wireless connection to a server (not shown) that may be hosted in a cloud computing system or in a local server. This connection is used to transmit the temperature information of each probe 10 to generate a permanent cook record. The wireless connection to a server may be Wi-Fi, cellular, or Bluetooth®.

FIG. 9 is a perspective view of an embodiment of a computer-based reader, in this case, a smartphone reader 122. Reader 122 includes a screen 124 on which data fields are displayed. These include a target field 126 which displays the target cooking temperature for which an alarm is set (shown as 185° F.), a temperature field 128 which displays the current temperature reading (shown as 121.4°

F.), and a probe-ID field 130 which displays the ID number of the currently-connected probe 10 (shown as probe 00003).

Figure 10:
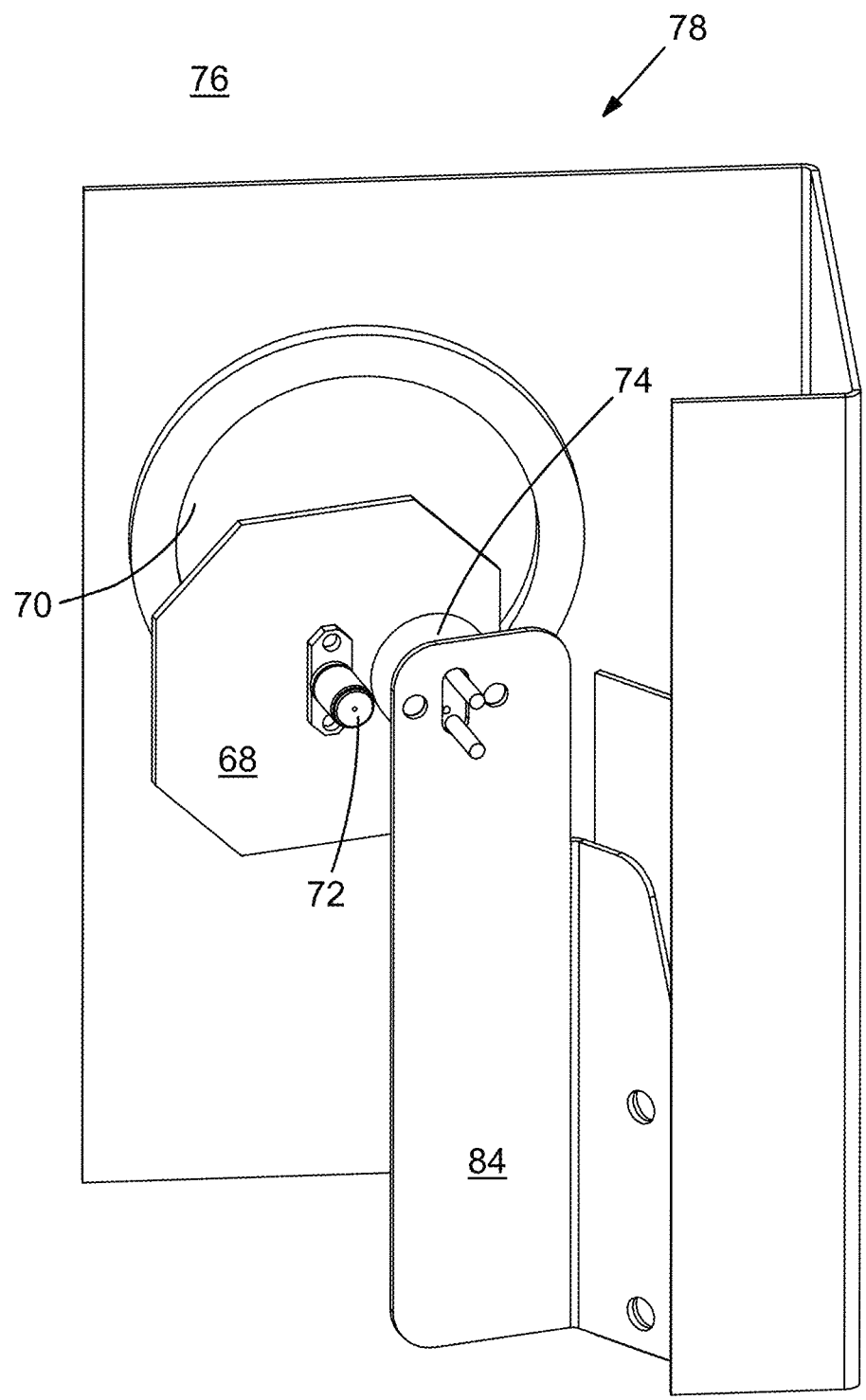
FIG. 10 is an inside perspective view of a portion of an oven-lamp cavity of a commercial rotisserie oven, including an antenna/LED assembly in the oven-lamp cavity.
Figure 11:
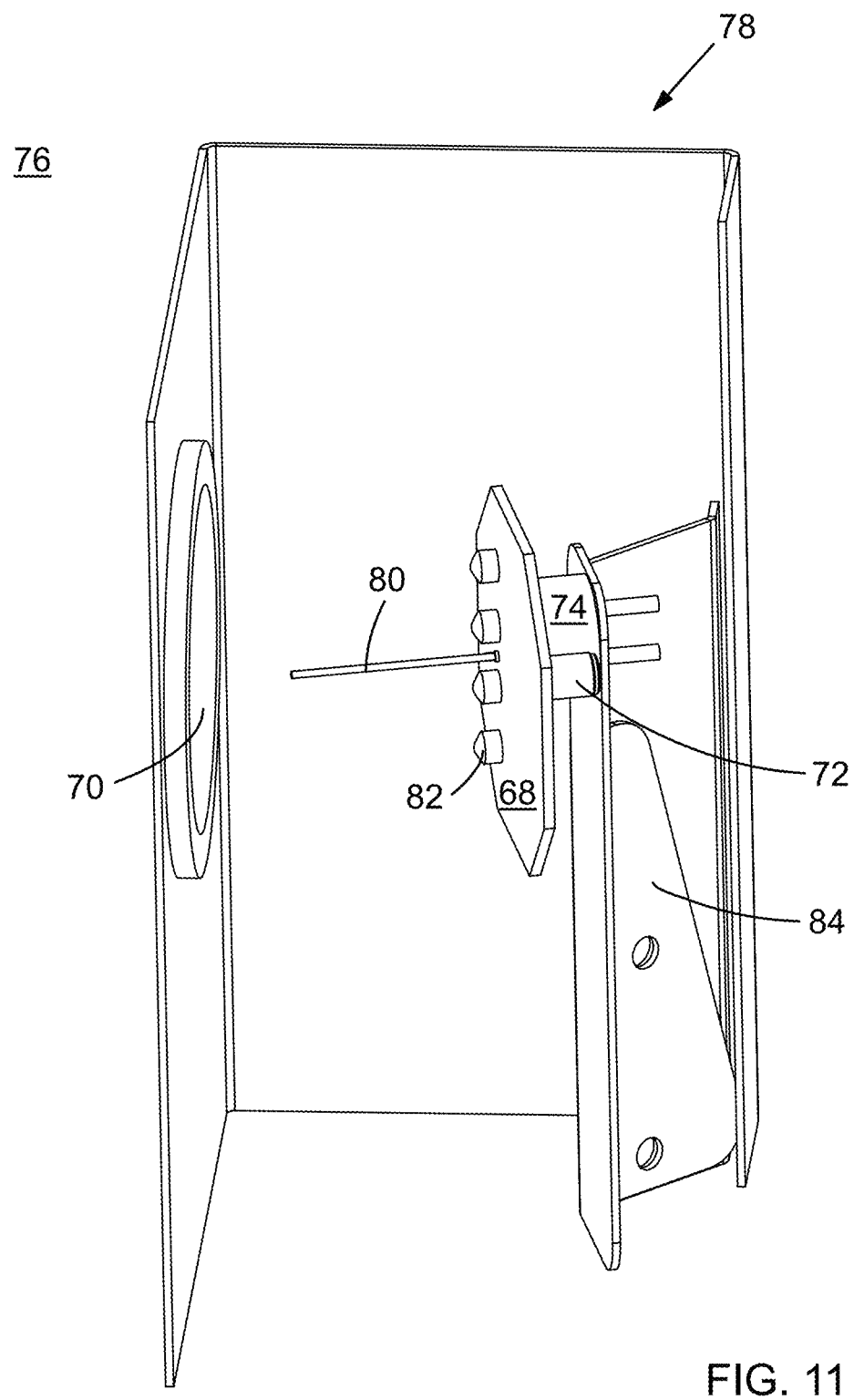
FIG. 11 is a perspective view (viewed from the rear) of the oven-lamp cavity of FIG. 10.

FIG. 10 is an inside perspective view of an oven-lamp cavity of a commercial rotisserie oven, including an antenna/LED assembly 68 in an oven-lamp cavity 78 of a portion of a commercial rotisserie oven, and FIG. 11 is a perspective view (viewed from the rear) of oven-lamp cavity 78. In this example application, oven-lamp cavity 78 is accessible from the side of such oven. Reader reads the temperature (or temperatures) being transmitted from each temperature probe 10. Dedicated reader 60 may be mounted on the outside of an oven door (not shown).

An antenna 80 connects to the Bluetooth® radio in reader 60 and is used to receive the signal from probe(s) 10. Antenna 80 may be placed inside the oven, outside the oven, or on the outside of an RF-transparent window 70. Antenna 80 may be part of an LED illumination printed circuit board assembly 68 with LEDs 82 (four shown) and a coaxial connector 72 that is plugged into a lamp socket 74 held by a bracket 84 located in oven-lamp cavity 78. Probes 10 are located within the cooking space 76 of the oven, and antenna/LED assembly 68 is located in an oven-lamp cavity 78.

Figure 12:
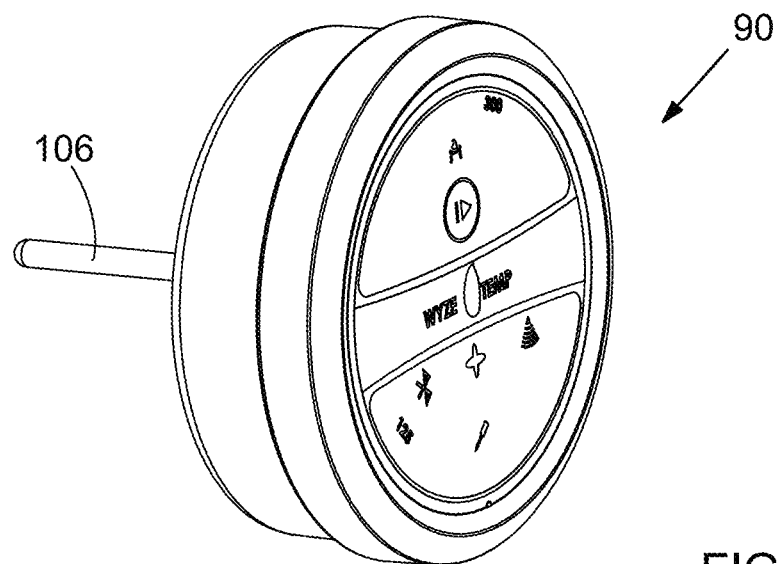
FIG. 12 is a perspective view of an embodiment of a grill gauge/reader.
Figure 13:
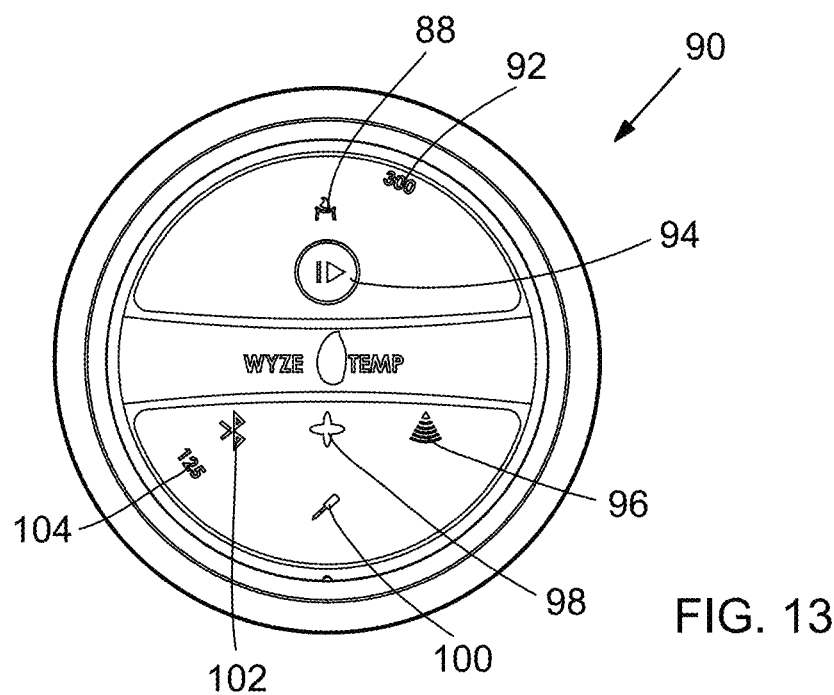
FIG. 13 is a front view of an embodiment of a grill gauge/reader.

FIGS. 12 and 13 are a perspective view and a front view, respectively, of a grill gauge/reader 90 from another application (a grill—not shown) of the inventive high-temperature measurement. In such an application, gauge/reader 90 may be to a grill or BBQ grill. Gauge/reader 90 receives data from temperature probe 10 data via Bluetooth® and re-transmits it to a smartphone, tablet computer, or other computer device 122', also using Bluetooth® (see FIG. 9). (The difference between reader 122 and reader 122' is that reader 122' is not serving as a direct data-reading device but as a display and input device for gauge/reader 90.) Gauge/reader 90 may also transmit a signal to a Wi-Fi router or cellular router. In this manner, for example, reader 122' may be used to monitor probe 10 temperatures remotely. Gauge/reader 90 may also send the data to a local server or cloud-hosted server to record permanent cook records. An alert may be set in reader 122 to indicate, by lighting an LED indicator 88, when a desired cook temperature is reached. Gauge/reader 90 may have a power button 94, a grill-temperature sensor 106, a grill-temperature indicator 92, a Wi-Fi connectivity LED 96, a fan indicator 98, a probe-present indicator 100, a Bluetooth® connection indicator 102, and probe 10 temperature indicator 104.

Figure 14:
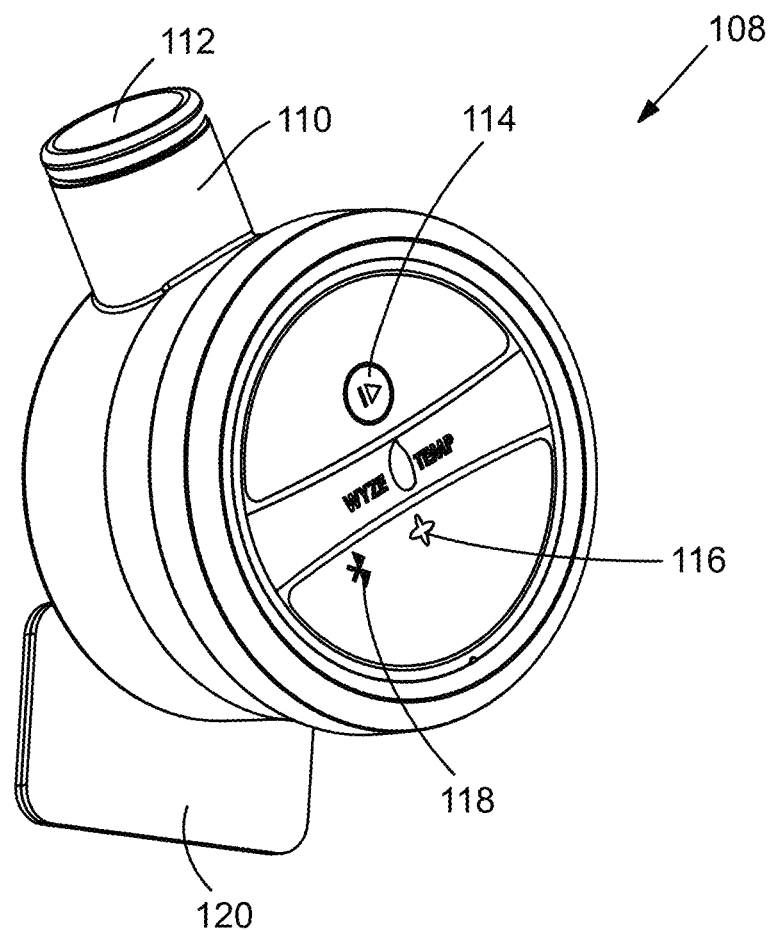
FIG. 14 is a perspective view of an embodiment of a grill fan control.
Figure 15A:
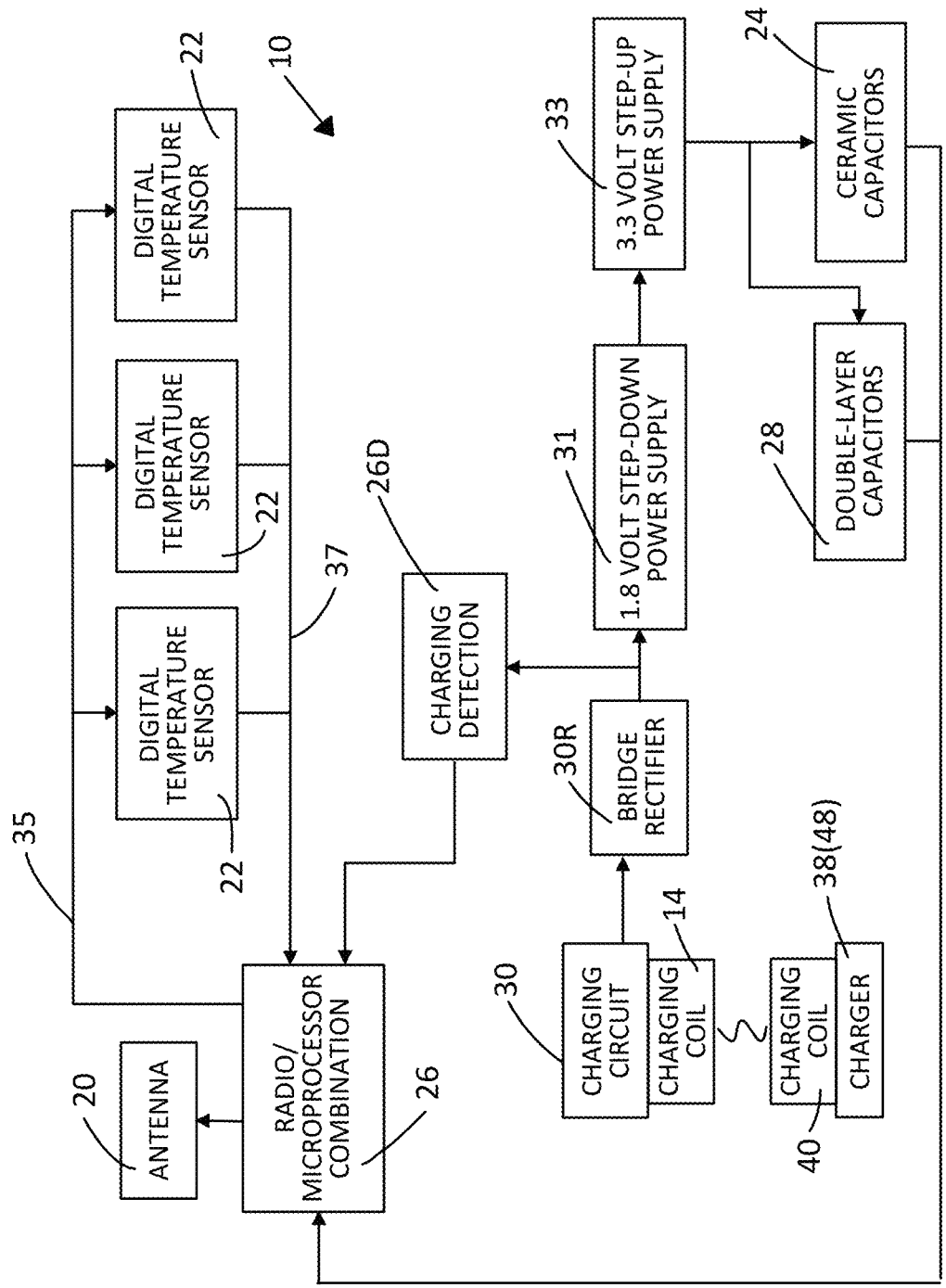
FIG. 15A is a functional block diagram representation of the electrical circuit of the wireless temperature probe of FIG. 1 employing a wireless charging circuit.
Figure 15B:
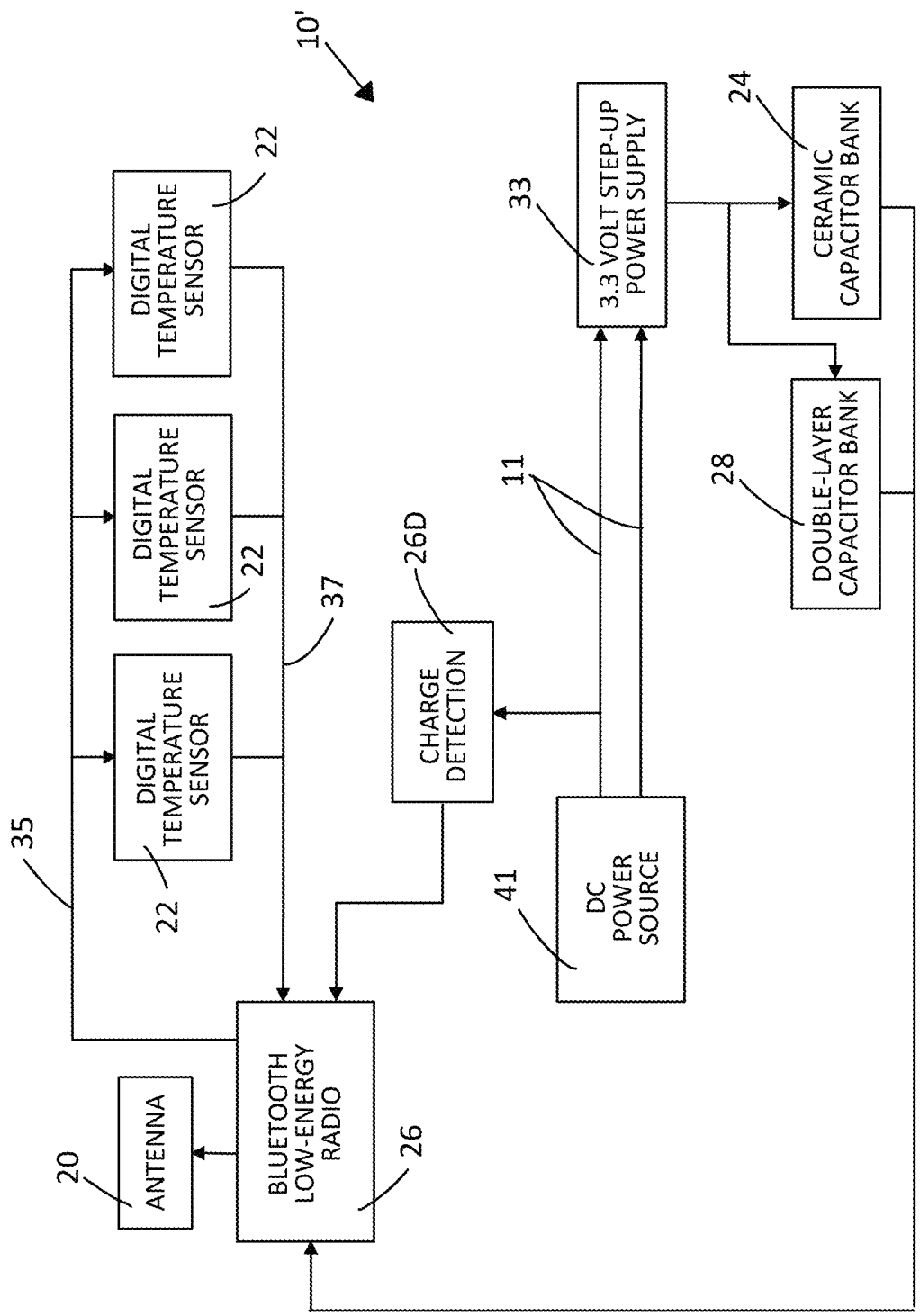
FIG. 15B is a functional block diagram representation of the electrical circuit of the wireless temperature probe of FIG. 1 employing a direct-contact charging circuit.

FIG. 14 is a perspective view of an embodiment of a grill fan control 108 which may be used in the grill application. When fossil-fuel grills are used, a fan 110 may be installed to blow air on the fire to control the grill temperature. Fan 110 may be battery-operated or line-powered, and communicates with reader/gauge 90. This communication may be Bluetooth®, Wi-Fi or another appropriate format. Fan 110 may have an inlet (not shown) covered by an adjustable air restriction cover 120, an air outlet 112, a power switch 114, a Bluetooth® connection indicator 118, and a fan indicator 116.

Figure 16A:
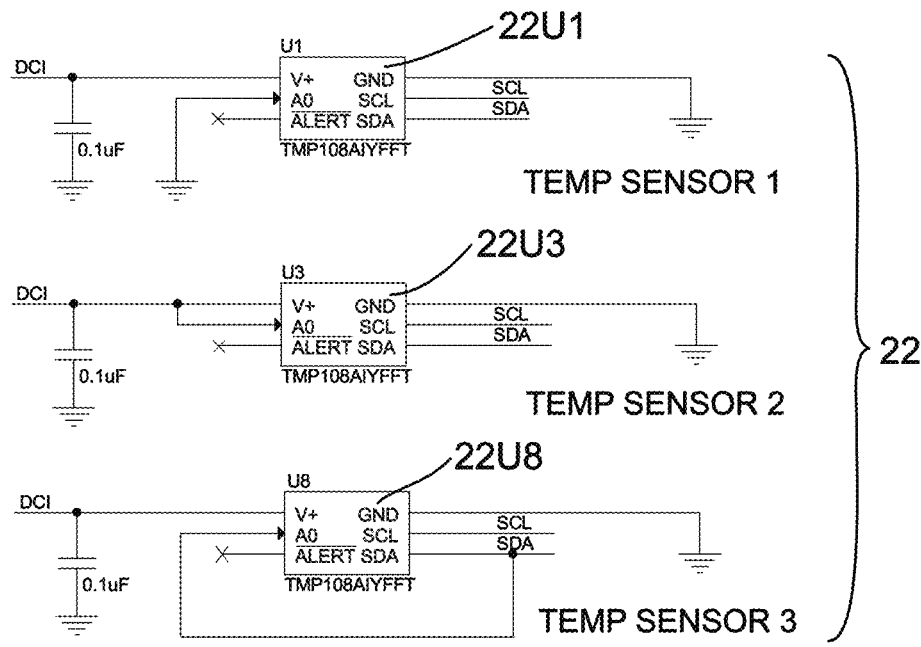
FIGS. 16A through 16E together show an electrical circuit schematic of a circuit embodiment of the wireless temperature probe of FIG. 1.
Figure 16B:
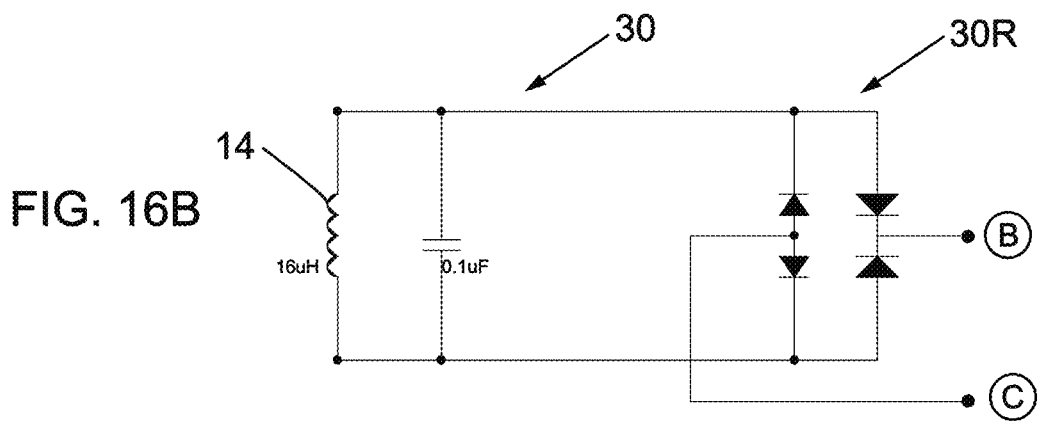
Figure 16C:
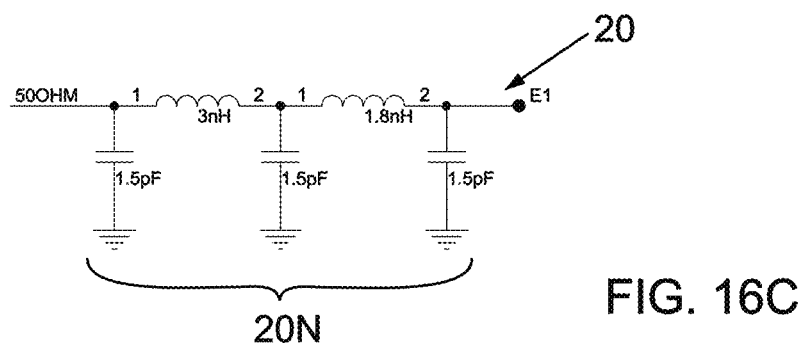

In addition to the detailed descriptions of FIGS. 16A-16E presented above, the following additional elements of the detailed circuit embodiment are illustrated. FIG. 16A illustrates three temperature sensors 22, each including one temperature sensor chip 22U1, 22U3 and 22U8, respectively. Such integrated temperature sensor chips may each be chip TMP108AIYFFT available from Texas Instruments™ Incorporated of Dallas, Tex. FIG. 16B illustrates charging circuit 30 with charging coil 14. FIG. 16B also illustrates bridge rectifier 30R, in this example, a full-wave diode bridge rectifier 30R. FIG. 16C illustrates antenna 20 with an impedance-matching network 20N. In this example, antenna 20 is an onboard trace antenna 20.

Figure 16D:
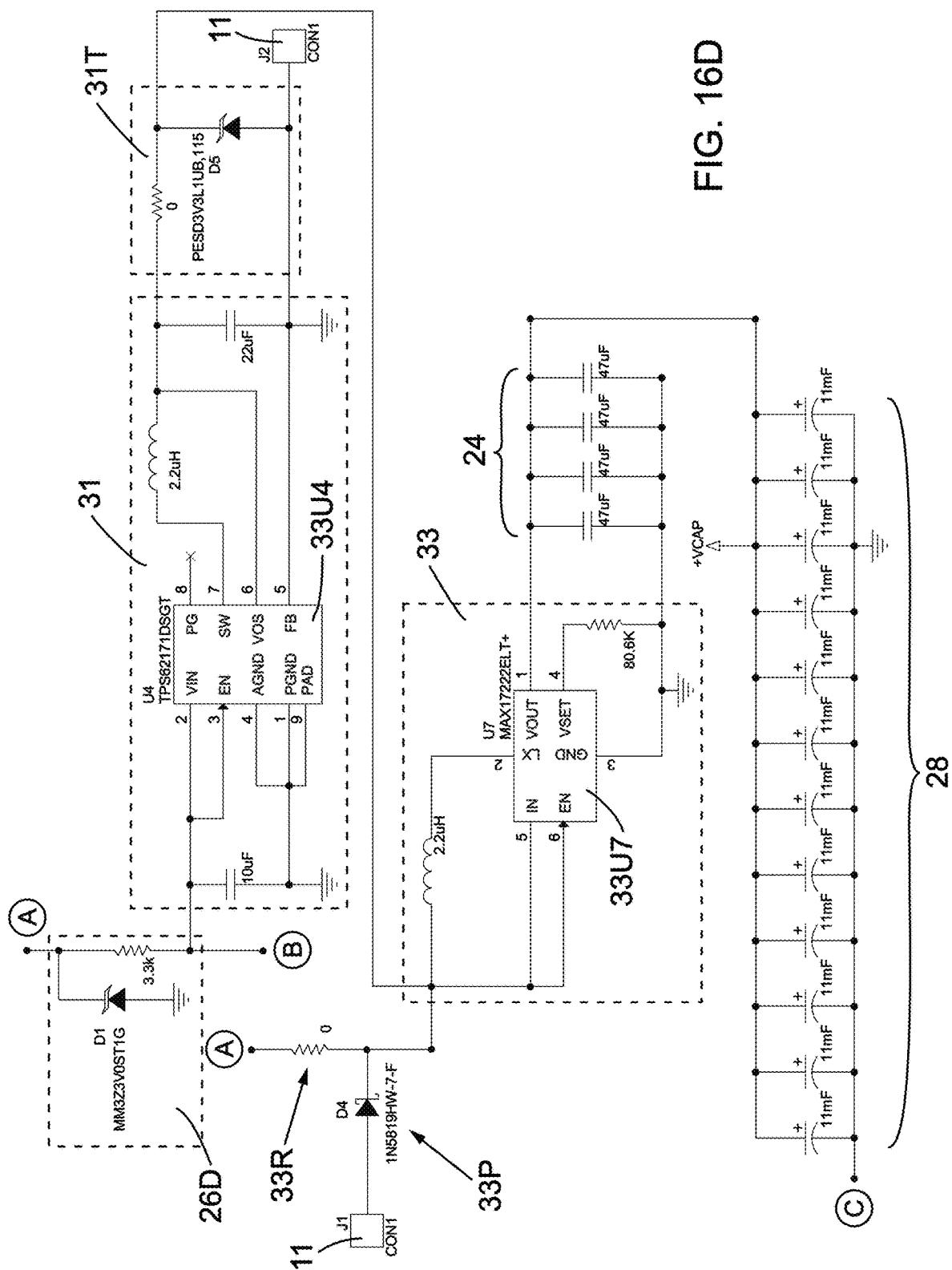

FIG. 16D illustrates several other portions of the detailed circuit. Charging detection circuit 26D is illustrated. Direct mechanical contacts 11 for probe 10' are shown. Boost power supply 33 includes a resistor 33R which has a value of zero ohms (short circuit) in probe 10'. Buck power supply 31 is not used in probe 10'. In probe 10, resistor 33R is not present, indicating an open connection. In this example, there are twelve (12) double-layer capacitors 28 and four (4) ceramic capacitors 24. Different numbers of capacitors 28 and 24 may be utilized depending on the desired operating parameters of probes 10 and 10'. FIG. 16D also illustrates a reverse-polarity protection diode circuit 33P and a transient suppression diode circuit 31T.

Figure 16E:
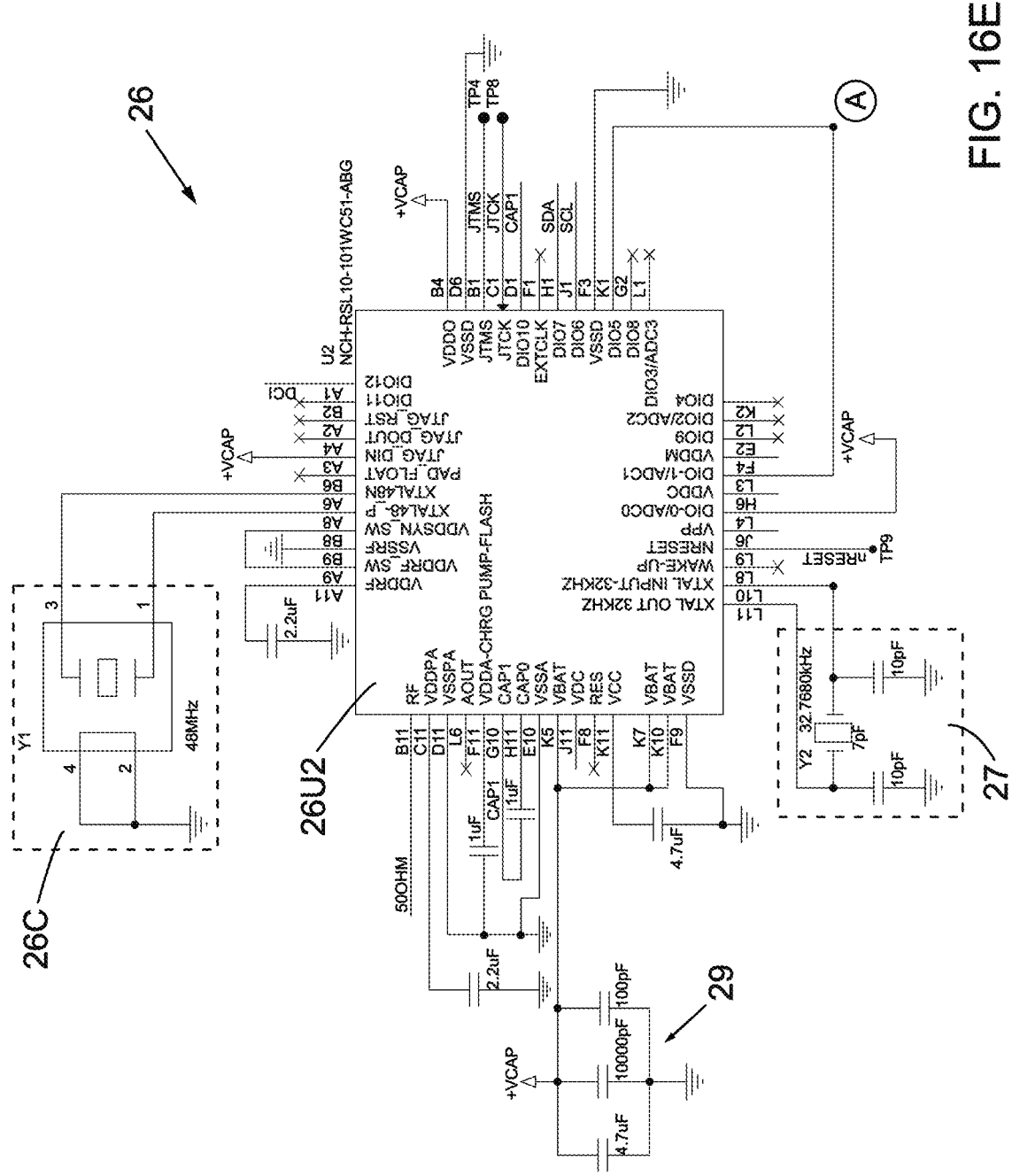

FIG. 16E illustrates radio/microprocessor combination 26, including three power-supply filter capacitors 29, a microprocessor clock circuit 26C, and a timer clock 27. In this example, microprocessor clock 26C operates at 48 MHz, and timer clock 27 operates at a frequency just over 32 kHz. Note that test points TP4, TP8, and TP9 are connection points used for programming the microprocessor within chip 26U2.

While the principles of this invention have been described in connection with specific embodiments, it should be understood clearly that these descriptions are made only by way of example and are not intended to limit the scope of the invention.

The invention claimed is:

1. A wireless temperature-measurement system comprising (a) one or more temperature probes each including one or more energy-storage capacitors which supply the electrical energy for operation of the one or more probes, at least a portion of the energy-storage capacitors being hermetically-sealed double-layer capacitors each having a ceramic base and a metal top, and (b) a probe-charging station having circuitry configured to supply electric charge to the energy-storage capacitors prior to the temperature probes being positioned to measure temperature, whereby each of the temperature probes does not outgas when exposed to temperatures of up to 316° C. (600° F.).

2. The wireless temperature-measurement system of claim 1 wherein the energy-storage capacitors are of one or more types of capacitors.

3. The wireless temperature-measurement system of claim 2 wherein at least a portion of the energy-storage capacitors are ceramic capacitors.

4. The wireless temperature-measurement system of claim 1 wherein:
each probe further includes circuitry to periodically measure temperature values and transmit the temperature values; and
the system further includes a reader to receive the temperature values.

5. The wireless temperature-measurement system of claim 4 wherein the reader is a programmable computer-based device.

6. The wireless temperature-measurement system of claim 4 wherein the reader is configured to store the temperature values.

7. The wireless temperature-measurement system of claim 4 wherein the probe-charging station is configured to send operational parameters to at least one of the probes during charging.

8. The wireless temperature-measurement system of claim 7 wherein the operational parameters include probe sleep times between periodic measurements of temperature values.

9. The wireless temperature-measurement system of claim 7 wherein the operational parameters include temperature-value-dependent probe sleep times.

10. The wireless temperature-measurement system of claim 7 wherein the reader is programmed to determine the operational parameters.

11. The wireless temperature-measurement system of claim 10 wherein the reader sends the operational parameters to the one or more probes during charging.

12. The wireless temperature-measurement system of claim 4 wherein the probe-charging station is configured to charge multiple probes simultaneously and to communicate to the reader a probe ID for each of the probes.

13. The wireless temperature-measurement system of claim 4 wherein the reader is configured to transmit a probe ID and temperature values to a cloud-hosted server or a local server to create an electronic record.

14. The wireless temperature-measurement system of claim 4 wherein the reader is a gauge/reader and the wireless temperature-measurement system has a fan which controls airflow to a grill.

15. The wireless temperature-measurement system of claim 14 wherein grill temperature is set using a smartphone.

16. The wireless temperature-measurement system of claim 1 wherein each probe is configured to detect when it is connected to the probe-charging station and to create a wireless communication link between itself and the probe-charging station.

17. The wireless temperature-measurement system of claim 1 wherein the probe-charging station charges the energy-storage capacitors wirelessly.

18. The wireless temperature-measurement system of claim 17 wherein the probe-charging station receives a probe ID from each of the probes and retransmits the probe ID to a reader.

19. The wireless temperature-measurement system of claim 1 wherein the probe-charging station charges the energy-storage capacitors through direct electrical connections.

20. The wireless temperature-measurement system of claim 19 wherein the probe-charging station receives a probe ID from each of the probes and retransmits the probe ID to a reader.

21. The wireless temperature-measurement system of claim 1 wherein the probe-charging station is configured to send operational parameters to the one or more probes during charging.

22. The wireless temperature-measurement system of claim 21 wherein the operational parameters include probe sleep times between periodic measurements of temperature values.

23. The wireless temperature-measurement system of claim 21 wherein the operational parameters include temperature-value-dependent probe sleep times.

24. The wireless temperature-measurement system of claim 1 wherein each of the temperature probes includes a step-up power supply, thereby substantially preventing the energy-storage capacitors from discharging while disconnected from the charger.

25. The wireless temperature-measurement system of claim 24 wherein each of the temperature probes includes a step-down power supply.

26. The wireless temperature-measurement system of claim 1 wherein each of the probes includes a sheath portion to accommodate internal electronic components.

27. The wireless temperature-measurement system of claim 26 wherein the sheath portion has an elliptical cross-sectional shape.

28. The wireless temperature-measurement system of claim 26 wherein the sheath portion has a circular cross-sectional shape.

* * * * *